March 7, 1933.  W. F. NEWHOUSE  1,900,657
FEED BELT GUIDE CONSTRUCTION
Filed April 30, 1932
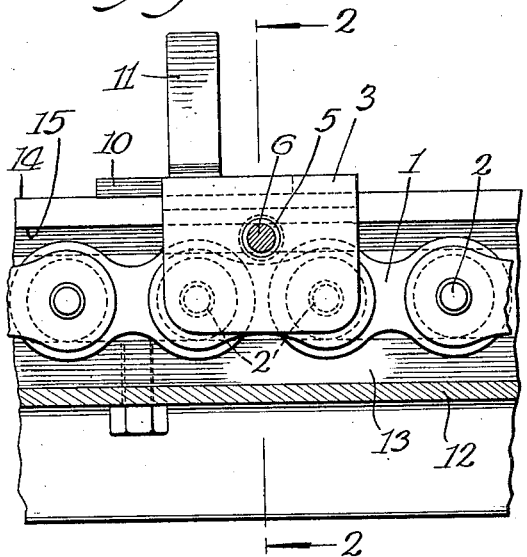
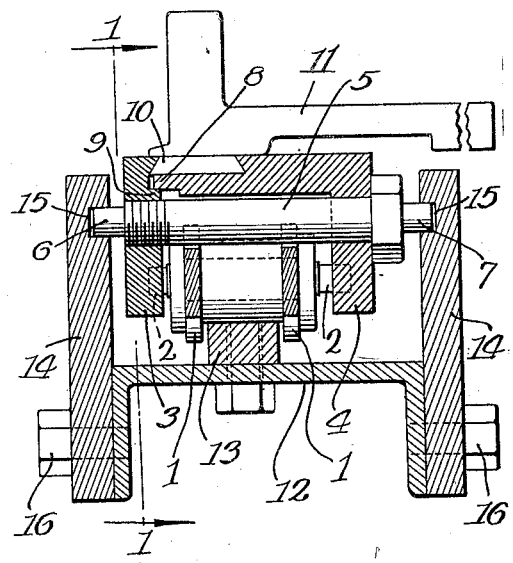
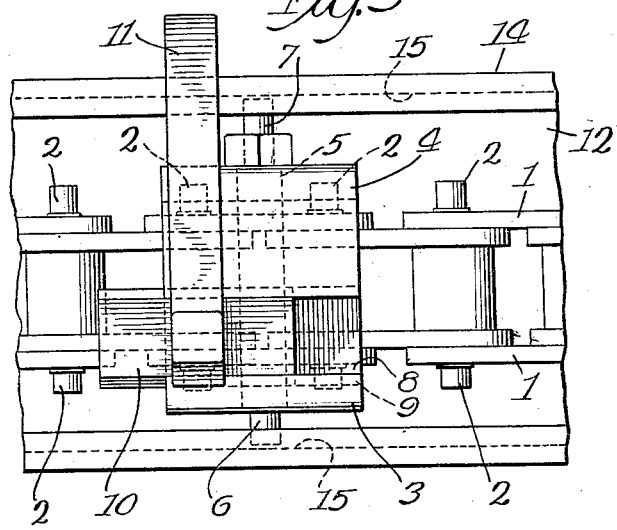
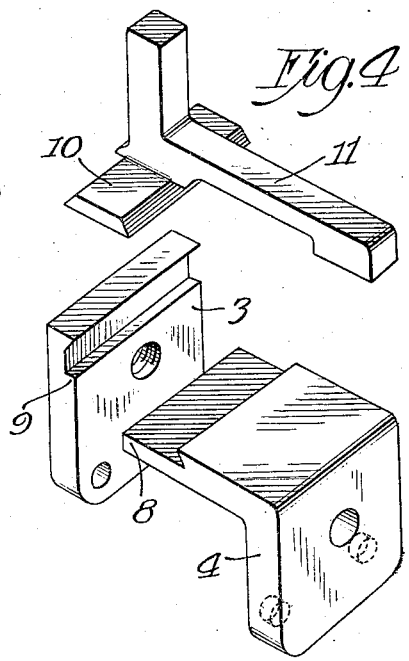
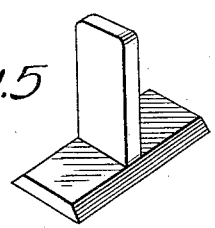
Inventor
Walter F. Newhouse
By Arthur F. Durand Atty.

Patented Mar. 7, 1933

1,900,657

UNITED STATES PATENT OFFICE

WALTER F. NEWHOUSE, OF BENTON HARBOR, MICHIGAN

FEED BELT GUIDE CONSTRUCTION

Application filed April 30, 1932. Serial No. 608,439.

This invention relates to work-feeding or controlling means for feeding or propelling the work on different kinds of machines, such as machines for making box or crate blanks, machines of this kind ordinarily comprising work-feeding or controlling means for moving the work forward in a horizontal plane below one or more staplers. Ordinarily, the work-controlling means for this purpose involves one or more feed chains or belts, having so-called feed dogs thereon for engaging portions of the work. It has also been more or less common to provide guiding means for the chains or feed belts.

Generally stated, the object of the invention herein shown and described is to provide an improved construction and arrangement for effectively guiding and supporting the feed chains or belts, thereby to prevent binding or improper action of the chains or belts, leaving them free to operate in the desired manner, but at the same time insuring a straight and steady path of travel for the chain or belt, and the feed dogs thereon, by engagement of the ends of the feed dog mounting bolts with stationary guiding grooves, whereby clearance is provided between the sides of the channel-like guide and the sides of the chain or link belt, the latter being supported on its under side, thereby substantially reducing friction and affording opportunity for adjustment and inspection of the chain or link belt, and of the feed dogs thereon, as will hereinafter more fully appear.

It is also an object to provide certain details and features of construction and combinations tending to increase the general efficiency and the desirability of a link belt or feed dog guide construction of this particular character.

To the foregoing and other useful ends, the invention consists in matters hereinafter set forth and claimed and shown in the accompanying drawing, in which—

Fig. 1 is a side elevation of a feed chain or link belt disposed in a guide embodying the principles of the invention, showing one side of the guide removed or broken away for convenience of illustration, this being a vertical longitudinal section on line 1—1 in Fig. 2 of the drawing.

Fig. 2 is a transverse vertical section on line 2—2 in Fig. 1 of the drawing.

Fig. 3 is a plan view of the said section or short length of the chain or link belt, and its associated guide construction, as shown in Fig. 1 of the drawing.

Fig. 4 is a perspective of one of the removable feed dogs which are removably mounted on the chain or link belt, shown at the top of this view, and of the two sections of the feed dog mounting, shown at the bottom of this view.

Fig. 5 is a perspective of a different form of feed dog.

As thus illustrated, the feed chain or link belt comprises the links 1, which are common and well known, and these links are held together by pins or pivots 2, as shown. The ends of these pins or pivots engage in sockets in the sections 3 and 4 of the feed dog mounting, and the two sections are held together by a transverse bolt 5, having one end screwed into the section 3, and having a bolt head at its other end. The two ends of this bolt are provided with reduced portions 6 and 7, as shown, and a tightening of this bolt will draw the two sections together, with the edge portion 8 of the section 4 in engagement with the supporting shoulder 9 of the section 3, as shown in Fig. 2 of the drawing. In this way, the dovetail-shaped base portion 10 of the feed dog 11 will be clamped in position, in the dovetail groove thus formed in the top of the feed dog mounting formed of the sections 3 and 4, as shown. To guide and support the feed chain or link belt, an inverted channel iron 12 is provided, and a wearing strip 13 is bolted or fastened to the upper side of this channel iron, thereby to engage the under side of the chain or link belt, as shown more clearly in Fig. 2 of the drawing. The sides of the channel iron 12 are provided with vertically disposed plates 14, spaced apart and disposed in parallel relation, each plate being provided on its inner side with a longitudinal groove 15, as shown. The cylindrical reduced portions 6 and 7 engage these grooves 15, and slide therein, and thus guide the chain or link belt and the feed dogs thereon, in a straight path of travel. The guide plates 14 are removably held in place by bolts or screws 16, and with this construction it will be seen that the feed belt is held against displacement either up or down or laterally, and with practically a minimum of friction and wear. While the channel plates 14 are thus made removable, in order to disengage the chain or link belt, if so desired, it will be understood that only the upper stretches or runs of two or more parallel feed chains or link belts of this kind are provided with guides of this character, whereby the lower stretches or runs hang loose, permitting easy adjustment or removal of the feed dogs when such is necessary or desirable.

Thus, it will be seen that the clamping bolts of the feed dog mountings, each feed dog mounting comprising a section 3 and a section 4, have end portions that are utilized to engage stationary guides, thereby to guide the link belt and feed dogs in a straight path of travel. These reduced end portions of the feed dog clamping bolts could support the entire weight of the upper stretch or run of the chain or link belt, and of the work supported thereon, if necessary or desirable. However, to minimize friction on these end portions 6 and 7, and consequent wear thereon, the rail or supporting strip 13 is employed, as previously explained, whereby the weight on the portions 15 may be reduced to a minimum. But, obviously, the chain or link belt is held positively against movement, either upwardly or downwardly or laterally, and consequently the box blanks or crate blanks or other parts, depending upon the character of the work, are propelled along the machine in the desired manner, with accuracy and certainty. But at the same time, these guides are of such character that the friction is practically reduced to a minimum, and in addition the parts are all readily accessible, and feed dogs that are readily interchangeable with other dogs, and that are readily adjustable longitudinally of the chain link belt, are properly guided in a definite and certain manner.

Obviously, the link belt or chain may have rollers to engage the rail or wearing strip 13, thereby further reducing the friction and the consequent wear.

With further reference to the engaging edge portion 8, of the horizontal portion of the section 4, and the shoulder 9, it will be seen that this shoulder is immediately below one side of the dovetail groove formation. Consequently, when the pull 5 is tightened, and the sections 3 and 4 are drawn toward each other, the dovetail groove formation tends to force the base 10 of the dog downward, and this forces the edge portion 8 downwardly against the shoulder 9, and in this way a very firm and rigid interlocking connection is provided between the two sections of the feed dog mounting. If desired, the shoulder 9 can even be made slightly beveled, thereby to provide a wedging action when the edge 8 engages said shoulder, in a manner that will be readily understood.

What I claim as my invention is:

1. In work-feeding or controlling instrumentalities, the combination of a feed chain or link belt, feed dogs held thereon by transverse clamping bolts, and a guide for said chain or link belt, said guide having means for engaging the end portions of said clamping bolts, preventing either lateral or vertical displacement of the feed belt.

2. A structure as specified in claim 1, said engaging means comprising parallel grooves preventing either upward or downward displacement of the ends of the clamping bolts.

3. A structure as specified in claim 1, in combination with a rail or wearing strip rigid with said guide, engaging the under side of said feed belt.

4. A structure as specified in claim 1, each feed dog having a two-section mounting by which the dog is adjustably and removably clamped in place, with one of said clamping bolts extending transversely through each mounting, and the pivots of the link belt having end portions engaging the sides of each mounting.

5. A structure as specified in claim 1, said guide comprising an inverted channel iron having parallel guide plates removably secured to the sides thereof, said plates having their inner sides provided with said means for engaging the ends of said clamping bolts.

6. In work-feeding or controlling means, the combination of a feed chain or link belt, a feed dog mounting comprising two sections for engaging the outer ends of the pivots of the belt, one section extending horizontally across the top of the belt, and the other section having a shoulder for engaging the edge of said horizontally extending section, together with a clamping bolt connecting the two sections together, with a dovetail groove connection between the top of the mounting and the feed dog whereby said bolt, when tightened crowds said edge into engagement with said shoulder and clamps the feed dog in place on top of the mounting.

7. A structure as specified in claim 6, said shoulder being immediately below one inclined side of the dovetail groove, whereby the dovetail groove formation serves to press said edge downwardly against said shoulder.

Specifications signed this twenty-seventh day of April 1932.

WALTER F. NEWHOUSE.